(12) United States Patent
Iori

(10) Patent No.: US 10,729,120 B2
(45) Date of Patent: Aug. 4, 2020

(54) **EXTERNAL TRAP FOR THE BEETLE *AETHINA TUMIDA***

(71) Applicant: Mauro Ciaccafava, Montopoli in Sabina (IT)

(72) Inventor: Maurizio Iori, Rome (IT)

(73) Assignees: Maurizio Iori, Rome (IT); Mauro Ciaccafava, Montopoli di Sabina (IT)

( * ) Notice: Subject to any disclaimer, the term of this patent is extended or adjusted under 35 U.S.C. 154(b) by 0 days.

(21) Appl. No.: 15/557,683

(22) PCT Filed: Mar. 30, 2016

(86) PCT No.: PCT/IT2016/000078
§ 371 (c)(1),
(2) Date: Sep. 12, 2017

(87) PCT Pub. No.: WO2016/157232
PCT Pub. Date: Oct. 6, 2016

(65) Prior Publication Data
US 2018/0064089 A1      Mar. 8, 2018

(30) Foreign Application Priority Data
Mar. 30, 2015   (IT) .............................. RM2015A0130

(51) Int. Cl.
*A01M 1/10*     (2006.01)
*A01K 47/06*    (2006.01)
*A01M 1/02*     (2006.01)

(52) U.S. Cl.
CPC ............. *A01M 1/103* (2013.01); *A01K 47/06* (2013.01); *A01M 1/02* (2013.01)

(58) Field of Classification Search
CPC ...... A01K 47/06; A01K 51/00; A01K 63/003; A01K 1/107; A01K 1/011; A01K 1/0114;
(Continued)

(56) References Cited

U.S. PATENT DOCUMENTS

| 200,574 A | * | 2/1878 | Schreiber et al. ...... | A01M 1/10 43/121 |
| 729,053 A | * | 5/1903 | Finley .................... | A01M 1/10 43/118 |

(Continued)

FOREIGN PATENT DOCUMENTS

| EP | 2322035 A1 | 5/2011 | | |
| GB | 1598010 A | * | 9/1981 | ............ A01M 1/02 |

(Continued)

OTHER PUBLICATIONS

Eric Smith, The Small Hive Beetle, Sep. 16, 2008, XP055251930, www.thebeeyard.org/wp-content/uploads/2012/06/small.hive_.beetle. thebeeyard.org_pdf.
(Continued)

*Primary Examiner* — Kathleen I Alker
(74) *Attorney, Agent, or Firm* — David Guerra

(57) ABSTRACT

The external trap for the small hive beetle *A. tumida* is composed of an opened on top plywood box and a grid of metal sheet with holes closes the box. The grid can be removed for inspection. Two angle aluminum hang the trap to the front wall of the beehive to catch the larva when it leaves the hive for pupation. The grid addresses the larvae inside the box filled with ground and nematodes that destroy them.

16 Claims, 3 Drawing Sheets

(58) Field of Classification Search
CPC .. A01K 1/0117; A01K 1/0121; A01K 1/0125; A01M 1/00; A01M 1/02; A01M 1/10; A01M 1/103; A01M 17/00; A47G 7/044; A47H 27/00; E06B 7/28; A01G 9/02; A01G 9/024
See application file for complete search history.

(56) References Cited

U.S. PATENT DOCUMENTS

| | | | | |
|---|---|---|---|---|
| 1,161,388 A * | 11/1915 | Johnson | ............ | A01M 1/02 43/115 |
| 1,956,389 A * | 4/1934 | Kintz | ............ | A47B 71/00 206/813 |
| 2,250,152 A * | 7/1941 | Clipp | ............ | A01K 47/06 43/65 |
| 2,477,509 A * | 7/1949 | Burgesser | ............ | A47G 7/044 211/88.03 |
| 3,180,697 A * | 4/1965 | Mulch | ............ | G03B 21/54 206/456 |
| 3,566,836 A * | 3/1971 | Elfert | ............ | A01K 67/0332 119/6.7 |
| 4,048,754 A * | 9/1977 | Laux | ............ | A01G 9/02 211/104 |
| 4,291,424 A * | 9/1981 | Angelis | ............ | A01K 47/06 449/19 |
| 4,337,541 A * | 7/1982 | Brown | ............ | A01K 47/06 449/19 |
| 4,367,563 A * | 1/1983 | Ferguson | ............ | A01K 47/06 449/19 |
| 4,454,616 A * | 6/1984 | Robson | ............ | A01K 47/06 449/18 |
| 4,494,263 A * | 1/1985 | Brown | ............ | A01K 47/06 449/19 |
| 4,599,757 A * | 7/1986 | Shaparew | ............ | A01K 47/06 449/19 |
| 4,867,731 A * | 9/1989 | Willard | ............ | A01K 51/00 449/2 |
| 5,328,049 A * | 7/1994 | Ritzow | ............ | A01K 63/003 119/481 |
| 5,404,839 A * | 4/1995 | Mancuso | ............ | A01K 63/003 119/246 |
| 5,531,186 A * | 7/1996 | Flood | ............ | A01K 1/0114 119/166 |
| 5,713,153 A * | 2/1998 | Cook | ............ | A01M 1/02 43/114 |
| 5,794,567 A * | 8/1998 | Itzhak | ............ | A01K 63/003 119/416 |
| 7,032,540 B2 * | 4/2006 | Bonner | ............ | A01K 1/03 119/452 |
| 7,309,274 B2 * | 12/2007 | Teal | ............ | A01K 51/00 449/2 |
| 7,632,167 B1 | 12/2009 | Miller | | |
| 7,735,800 B2 * | 6/2010 | Lunato | ............ | A47G 7/044 248/146 |
| 7,757,433 B2 * | 7/2010 | Levot | ............ | A01K 47/06 43/107 |
| 9,867,364 B2 * | 1/2018 | Keller | ............ | A01K 63/006 |
| 2007/0224913 A1 * | 9/2007 | Brisson | ............ | A01K 51/00 449/3 |
| 2008/0280528 A1 * | 11/2008 | Mudd | ............ | A01K 51/00 449/2 |
| 2016/0330938 A1 * | 11/2016 | Jones | ............ | A01K 47/06 |

FOREIGN PATENT DOCUMENTS

WO    2007102035 A2    9/2007
WO    2008036996 A1    4/2008

OTHER PUBLICATIONS

Michael Hood, Handbook of Small Hive Beetle IPM, Oct. 1, 2011, pp. 1-20, XP055251936, http://www.clemson.edu/psapublishing/Pages/Entom/EB160.pdf.

* cited by examiner

EXTERNAL TRAP FOR THE BEETLE AETHINA TUMIDA

CROSS-REFERENCE TO RELATED APPLICATION

This application is an U.S. national phase application under 35 U.S.C. § 371 based upon co-pending International Application No. PCT/IT2016/000078 filed on Mar. 30, 2016. Additionally, this U.S. national phase application claims the benefit of priority of co-pending International Application No. PCT/IT2016/000078 filed on Mar. 30, 2016 and Italy Application No. RM2015A000130 filed on Mar. 30, 2015. The entire disclosures of the prior applications are incorporated herein by reference. The international application was published on Oct. 6, 2016 under Publication No. WO 2016/157232 A1.

BACKGROUND

Technical Field

The present technology relates to an external trap for the small hive beetle is part of the control of the infestation of apiaries by blocking the cycle of small hive beetle in the soil.

Background Description

The external trap for the small hive beetle is part of the control of the infestation of apiaries by blocking the cycle of small hive beetle in the soil. The development cycle of the beetle takes place in the following steps: after entering the hive in a few days, at most a week, the beetle lays eggs not easy identification (1 mm) from which arise larvae that after no more two weeks are directed outside to become pupa in the soil. In the growing phase, having to feed the eggs a damage partially visible in the combs is created and not always identifiable if the number of hives is quite high because the time of cycle is short (1-2 weeks). Studies on the propagation of *A. tumida* conducted by Spiwock S. et al. (Apidologie 39 (2008) 683-693) show that the beetle can move in apiaries also 10 km away.

To stop the cycle described have been developed various traps to be placed inside the hive: the Hood beetle trap that fits inside the hive between two combs and filled with apple cider vinegar and mineral oil to attract and to kill the adults *A. tumida* (U.S. Pat. No. 7,632,167 B1 Miller David 15 Dec. 2009), the West beetle trap that is designed to be resting on the bottom of the hive (EP 2 322 035 Infantidis Michael Grece 18 May 2011). Chemicals are also used with the active principles Permethrin, (family of pyrethroids) to stop the development process of pupation in the soil surrounding the hive.

While the above-described devices fulfill their respective, particular objectives and requirements, the aforementioned patents do not describe an external trap for the small hive beetle is part of the control of the infestation of apiaries by blocking the cycle of small hive beetle in the soil.

Therefore, a need exists for a new and novel external beetle trap that can be used for controlling the infestation of apiaries by blocking the cycle of small hive beetle in the soil. In this regard, the present technology substantially fulfills this need. In this respect, the external beetle trap according to the present technology substantially departs from the conventional concepts and designs of the prior art, and in doing so provides an apparatus primarily developed for the purpose of for controlling the infestation of apiaries by blocking the cycle of small hive beetle in the soil.

BRIEF SUMMARY OF THE PRESENT TECHNOLOGY

According to one aspect of the present technology, the present technology can include an external trap for a small hive beetle. The external trap can include a box having a thickness of 10 mm, a length of 42.5 cm, a width of 14.0 cm, a height of 16.0 cm. The box can further include two side walls and a front wall, each having a height of 16.0 cm, a back wall having a height of 14 cm, a top edge, a bottom and an open top. A rectilinear groove can be located internally on the two side walls and on the back wall. The back wall can be adapted for placement below an entrance of a beehive. The groove can be located 2 cm from the top edge of the box and can have a 4 mm depth and a 3 mm height. A slit can be defined on the front wall, and can be located 2 cm from the top edge and having a height of 3 mm and a length of 42.5 cm. A grid of galvanized steel sheet can be included, where the grid can have a thickness of 1 mm and holes each having a diameter of 4 mm. The holes can be staggered and spaced 10 mm apart. The grid can form a top surface that, when inserted into the slit and the groove, closes the box. Two aluminum angular elements can be included, and each can have dimensions of 2.5 cm×3.0 cm and a height of 14.0 cm. Each angular element can have two slotted horizontal holes that are vertically spaced by 4 cm. The bottom of the box can have four holes, each having a diameter of 2 cm and being closed by a net having dimensions of 0.5 mm×0.5 mm.

According to another aspect of the present technology, the present technology can include a method of manufacture of the trap achievable with plastics or metals in one body.

In some embodiment of the present technology, the box can have a thickness of 10 mm, a length of 42.5 cm, a width of 14.0 cm, a height of 16.0 cm, wherein the two side walls and the front wall each can have a height of 16.0 cm, and the back wall has a height of 14 cm.

In some embodiment of the present technology, the groove can be located 2 cm from the top edge of the box and having a 4 mm depth and a 3 mm height.

In some embodiment of the present technology, the slit can be located 2 cm from the top edge and having a height of 3 mm and a length of 42.5 cm.

In some embodiment of the present technology, the grid sheet can be of galvanized steel and can have a thickness of 1 mm, and the holes of the grid sheet each can have a diameter of 4 mm and can be staggered and spaced 10 mm apart.

In some embodiment of the present technology, the two aluminum angular elements each can have dimensions of 2.5 cm×3.0 cm and a height of 14.0 cm, and the slotted horizontal holes can be two slotted horizontal holes vertically spaced by 4 cm.

In some embodiment of the present technology, the holes of the bottom of the box can be four holes, each having a diameter of 2 cm, and the net has dimensions of 0.5 mm×0.5 mm.

In some embodiment of the present technology, the four holes allow for water drainage.

In some embodiment of the present technology, the slotted horizontal holes of the angular elements can be adapted to anchor the trap to a front wall of the beehive.

In some embodiment of the present technology, the trap can have a fill volume of between 400 ml and 1000 ml for receiving earth.

In some embodiment of the present technology, the box can be formed of plastic material.

There has thus been outlined, rather broadly, features of the present technology in order that the detailed description thereof that follows may be better understood and in order that the present contribution to the art may be better appreciated.

Numerous objects, features and advantages of the present technology will be readily apparent to those of ordinary skill in the art upon a reading of the following detailed description of the present technology, but nonetheless illustrative, embodiments of the present technology when taken in conjunction with the accompanying drawings.

BRIEF DESCRIPTION OF THE DRAWINGS

The present technology will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE PRESENT TECHNOLOGY

Figure 1:
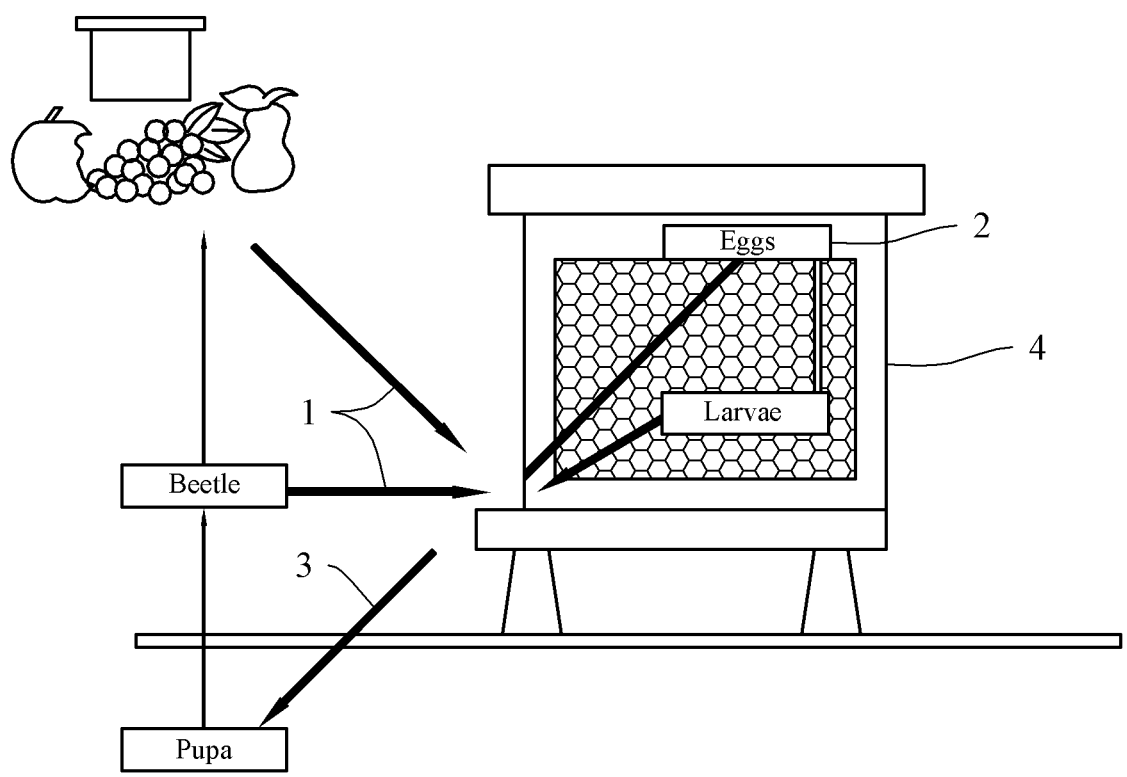
FIG. 1 is a schematic view of an embodiment of the present technology.
Figure 2:
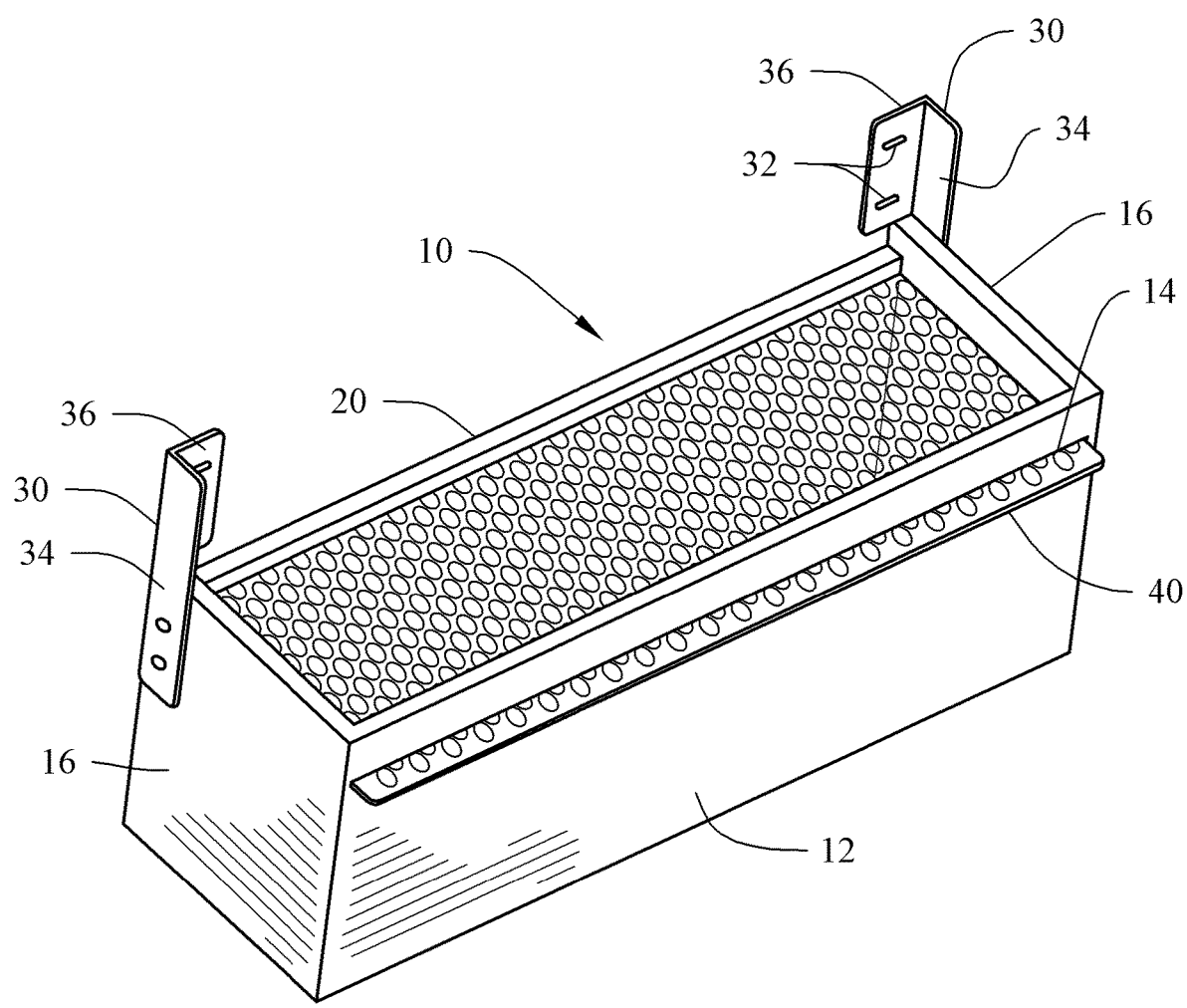
FIG. 2 is a perspective view of the external beetle trap of the present technology with the grid in a closed position.
Figure 3:
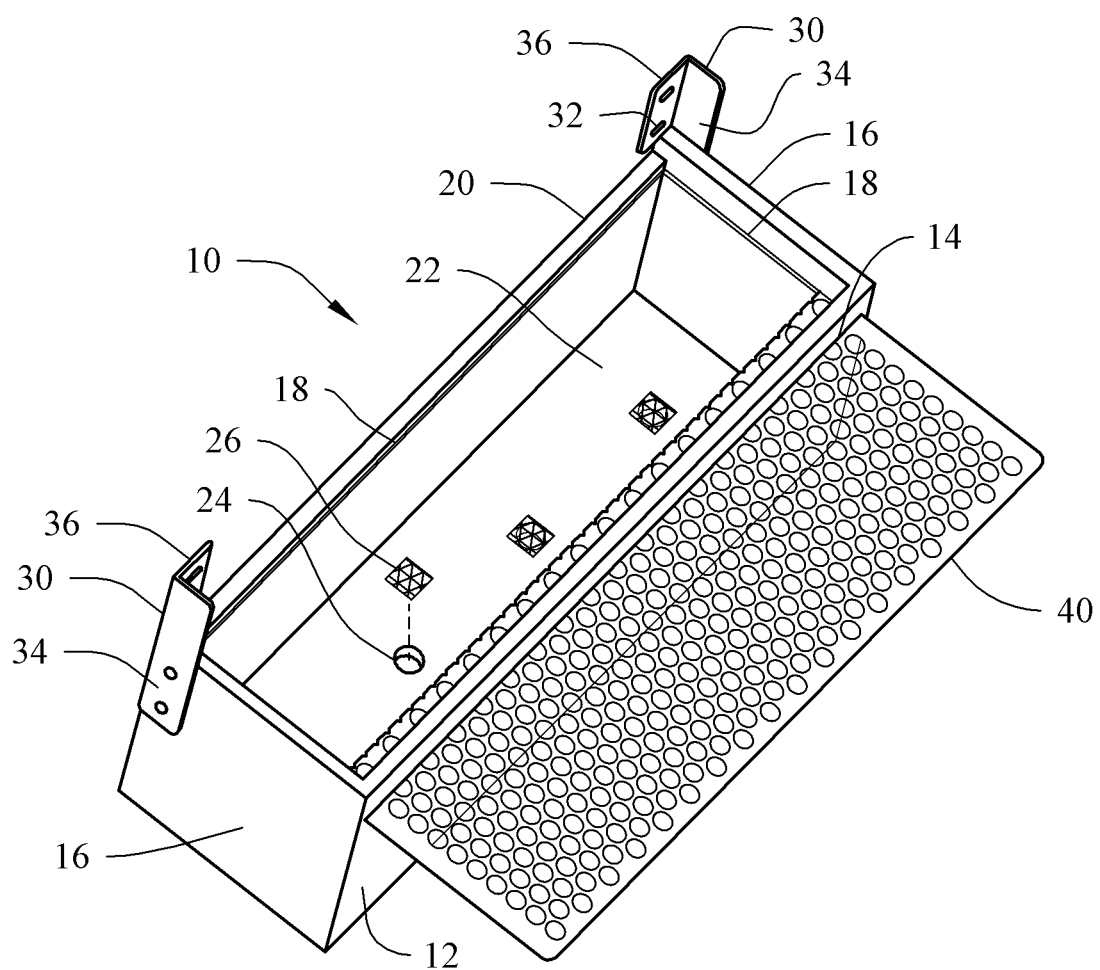
FIG. 3 is a perspective view of the external beetle trap of the present technology with the grid in an open position.

Referring now to the drawings, and particularly to FIGS. 1-3, an embodiment of the external beetle trap of the present technology is shown and generally designated by the reference numeral 10.

FIG. 1 describes the cycle: (1) the adult beetle enters, (2) the adult lays eggs inside the hive 4, (3) the larvae come out to finish their cycle and to start a new one.

So there are three places where you can take action to stop the cycle of the beetle: when the adult enters (1), when the adult search for a place to lay the eggs (2) or when the larvae come out (3).

The trap 10 for the beetle *A. tumida* is described in FIG. 2 in perspective. It consists of:

A box of plywood, 10 mm thickness, length 42.5 cm, width 14.0 cm, height 16.0 cm for the side walls 16 and front wall 12, 14 cm height for the back wall 20. The box is opened on top as shown in FIG. 2.

A grid 40 of sheet metal, thickness 1 mm with holes of diameter 4 mm staggered and 10 mm present on the entire surface that closes the box.

A rectilinear groove 18 2 cm from the top edge of the box, 4 mm depth, 3 mm height internally the two side walls 16 of the box and to the face placed below the entrance of the hive 4.

A slit 14 2 cm from the top edge, height of 3 mm, length 40.5 cm is on the front wall 12 to extract the grid 40.

Two aluminum angular dimensions 30 of 2.5 cm×3.0 cm, height 14.0 cm with two slotted holes 32 horizontal, vertically spaced 4 cm to anchor and center the trap 10 to the front wall of the beehive 4. The angular dimensions 30 include a first member 34 attachable to a side 16 of the box, and a second member 36 featuring the slotted holes 32. The second member 36 is angled to the first member 34, and has a length less than the first member 34 to be located above a top edge of their respective side walls 16 and/or back wall 20.

On the bottom 22 there are 4 holes 24, 2 cm in diameter, closed by a net 26 0.5 mm×0.5 mm required for the rainwater runoff.

FIG. 3 shows that the grid 40 can be removed to allow filling or emptying the trap 10 from the earth or for inspection.

The external trap 10 of *A. tumida* aims to limit the spread of the beetle in the rest of the apiary confining the larvae in a drawer located directly at the level of the front door of the hive 4, in front of it. The larva when it comes out for pupation is addressed by the presence of a perforated grill 40 within a tank containing alkaline earth (sand) and soil nematodes that destroy the larvae. The application of the trap requires that the hive has a closed bottom or a grid of 2 mm×2 mm pitch used for the control of *Varroa* so as not to allow other routes of exit at the larva in addition to the front door of the hive where lies the trap.

The external trap is useful for the purposes of a productive activity in the field of beekeeping with the possibility of industrial use. Companies potentially interested are those that produce material beekeeping. The box and the grid, the main components of the trap, can be industrially manufactured with plastic materials UV protected, non-food or even metal. Geographical areas in which the implementation of the invention is of potential interest in several Continents including the Europe.

The invention claimed is:

1. An external trap for a small hive beetle comprising:
   a box including two side walls, a front wall, a back wall having a height of 14 cm, a top edge, a bottom and an open top;
   a rectilinear groove located internally on the two side walls and on the back wall, the back wall being adapted for placement below an entrance of a beehive;
   a slit defined through the front wall;
   a grid sheet defining a plurality of staggardly spaced apart holes, the grid forming a top surface that, when inserted into the slit and the groove, closes the box; and
   one or more angular elements having one or more slotted horizontal holes; and
   wherein the bottom of the box has one or more holes closed by a net.

2. The trap according to claim 1, wherein the box has a thickness of 10 mm, a length of 42.5 cm, a width of 14.0 cm, a height of 16.0 cm, wherein the two side walls and the front wall each has a height of 16.0 cm, and the back wall has a height of 14 cm.

3. The trap according to claim 1, wherein the groove being located 2 cm from the top edge of the box and having a 4 mm depth and a 3 mm height.

4. The trap according to claim 1, wherein the slit being located 2 cm from the top edge and having a height of 3 mm and a length of 42.5 cm.

5. The trap according to claim 1, wherein the grid sheet is of galvanized steel and has a thickness of 1 mm, and the holes of the grid sheet each having a diameter of 4 mm and are staggered and spaced 10 mm apart.

6. The trap according to claim 1, wherein the two aluminum angular elements each having dimensions of 2.5 cm×3.0 cm and a height of 14.0 cm, and the slotted horizontal holes are two slotted horizontal holes vertically spaced by 4 cm.

7. The trap according to claim 1, wherein the holes of the bottom of the box are four three holes, each having a diameter of 2 cm, and the net has dimensions of 0.5 mm×0.5 mm.

8. The trap according to claim 7, wherein the four holes allow for water drainage.

9. The trap according to claim 1, wherein the slotted horizontal holes of the angular elements are adapted to anchor the trap to a front wall of the beehive.

10. The trap according to claim 1, wherein the trap has a fill volume of between 400 ml and 1000 ml for receiving earth.

11. The trap according to claim 1, wherein the box is formed of plastic material.

12. An external trap for a small hive beetle comprising:
- a box having a thickness of 10 mm, a length of 42.5 cm, a width of 14.0 cm, a height of 16.0 cm, the box further including two side walls and a front wall, each having a height of 16.0 cm, a back wall having a height of 14 cm, a top edge, a bottom and an open top;
- a rectilinear groove located internally on the two side walls and on the back wall, the back wall being adapted for placement below an entrance of a beehive, the groove being located 2 cm from the top edge of the box and having a 4 mm depth and a 3 mm height;
- a slit on the front wall, the slit being located 2 cm from the top edge and having a height of 3 mm and a length of 42.5 cm;
- a grid of galvanized steel sheet, the grid having a thickness of 1 mm and holes each having a diameter of 4 mm, the holes being staggered and spaced 10 mm apart, the grid forming a top surface that, when inserted into the slit and the groove, closes the box; and
- two aluminum angular elements, each having dimensions of 2.5 cm×3.0 cm and a height of 14.0 cm, each angular element having two slotted horizontal holes that are vertically spaced by 4 cm; and
- wherein the bottom of the box has four three holes, each having a diameter of 2 cm and being closed by a net having dimensions of 0.5 mm×0.5 mm.

13. The trap according to claim 12, wherein the slotted horizontal holes of the angular elements are adapted to anchor the trap to a front wall of the beehive.

14. The trap according to claim 12, wherein the four holes allow for water drainage.

15. The trap according to claim 12, wherein the trap has a fill volume of between 400 ml and 1000 ml for receiving earth.

16. The trap according to claim 12, wherein the box is formed of plastic material.

* * * * *